United States Patent
Westphal et al.

(10) Patent No.: US 9,951,640 B2
(45) Date of Patent: Apr. 24, 2018

(54) STRUCTURE AND METHOD FOR PROVIDING COMPLIANCE AND SEALING BETWEEN CERAMIC AND METALLIC STRUCTURES

(71) Applicant: Rolls-Royce Corporation, Indianapolis, IN (US)

(72) Inventors: William I. Westphal, Avon, IN (US); Clayton C. Smith, New Braunfels, TX (US)

(73) Assignee: Rolls-Royce Corporation, Indianapolis, IN (US)

( * ) Notice: Subject to any disclaimer, the term of this patent is extended or adjusted under 35 U.S.C. 154(b) by 721 days.

(21) Appl. No.: 14/142,292

(22) Filed: Dec. 27, 2013

(65) Prior Publication Data

US 2014/0308113 A1    Oct. 16, 2014

Related U.S. Application Data

(60) Provisional application No. 61/773,096, filed on Mar. 5, 2013.

(51) Int. Cl.
*F01D 11/00* (2006.01)
*F01D 25/24* (2006.01)
*F01D 25/28* (2006.01)

(52) U.S. Cl.
CPC ............ *F01D 11/006* (2013.01); *F01D 11/00* (2013.01); *F01D 25/246* (2013.01); *F01D 25/28* (2013.01);

(Continued)

(58) Field of Classification Search
CPC ...... F01D 11/00; F01D 11/006; F01D 25/246; F01D 25/28

(Continued)

(56) References Cited

U.S. PATENT DOCUMENTS 5,192,185 A * 3/1993 Leonard ................. F01D 11/08
415/170.1
6,076,835 A * 6/2000 Ress ..................... F16J 15/0887
277/637

(Continued)

FOREIGN PATENT DOCUMENTS

EP        1775421 A2    4/2007
EP        2514925 A2    10/2012

(Continued)

OTHER PUBLICATIONS

English Abstract for FR2951494(A1).
International Search Report for PCT/US2013/077892 dated Oct. 20, 2014.

*Primary Examiner* — Richard Edgar
(74) *Attorney, Agent, or Firm* — Fishman Stewart PLLC

(57) ABSTRACT

A structure providing compliance and sealing between ceramic or ceramic composite (CMC) part and a metallic part has an interface component for centering the CMC part in the metallic part, thus reducing thermal stress motion of the CMC component. In gas turbine engine applications, the structure comprises a CMC blade track inserted in a clip placed within a metallic hanger. The clip provides for radial compliance and secures controlled leakage of cooling air required to ensure that acceptable temperatures are maintained for the metallic structures. A washer is positioned adjacent to the clip provide for axial orientation of the blade track.

20 Claims, 2 Drawing Sheets

(52) U.S. Cl.
CPC ...... *F05D 2260/30* (2013.01); *F05D 2260/94* (2013.01); *F05D 2300/6033* (2013.01); *Y02T 50/672* (2013.01); *Y10T 29/4932* (2015.01)

(58) Field of Classification Search
USPC .................. 415/134, 138, 139, 209.2, 209.3
See application file for complete search history.

(56) References Cited

U.S. PATENT DOCUMENTS

| | | | |
|---|---|---|---|
| 6,113,349 | A | 9/2000 | Bagepalli et al. |
| 6,315,519 | B1* | 11/2001 | Bagepalli ............... F01D 11/08 415/135 |
| 6,726,448 | B2 | 4/2004 | McGrath et al. |
| 6,758,653 | B2* | 7/2004 | Morrison ................ F01D 25/12 415/116 |
| 6,926,284 | B2* | 8/2005 | Hirst ..................... F01D 11/005 277/603 |
| 6,966,752 | B2* | 11/2005 | Gieg .................... F01D 25/246 415/173.4 |
| 7,117,983 | B2 | 10/2006 | Good et al. |
| 7,494,317 | B2 | 2/2009 | Keller et al. |
| 7,556,475 | B2 | 7/2009 | Roberts, III et al. |
| 7,562,880 | B2* | 7/2009 | Paprotna ............. F16J 15/3288 277/644 |
| 7,563,071 | B2 | 7/2009 | Campbell et al. |
| 7,722,317 | B2 | 5/2010 | Schiavo et al. |
| 7,771,159 | B2* | 8/2010 | Johnson ................ F01D 11/008 277/650 |
| 8,061,977 | B2 | 11/2011 | Keller et al. |
| 8,079,807 | B2* | 12/2011 | Shapiro ................... F01D 11/12 415/173.1 |
| 2004/0047726 | A1 | 3/2004 | Morrison |
| 2010/0092281 | A1* | 4/2010 | Habarou ................ F01D 11/08 415/200 |
| 2010/0284816 | A1* | 11/2010 | Propheter-Hinckley F01D 5/3007 416/241 B |
| 2011/0293410 | A1 | 12/2011 | Marusko et al. |
| 2012/0082540 | A1 | 4/2012 | Dziech et al. |
| 2012/0156029 | A1 | 6/2012 | Karafillis et al. |
| 2012/0171023 | A1 | 7/2012 | Albers et al. |
| 2012/0308367 | A1 | 12/2012 | Luczak |
| 2013/0004306 | A1 | 1/2013 | Albers et al. |
| 2013/0177411 | A1* | 7/2013 | Weber ................... F01D 25/246 415/209.3 |
| 2014/0250893 | A1* | 9/2014 | Chan .................... F01D 25/145 60/752 |
| 2015/0016970 | A1* | 1/2015 | Smith .................... F01D 11/08 415/173.1 |

FOREIGN PATENT DOCUMENTS

| | | |
|---|---|---|
| FR | 2951494 A1 | 4/2011 |
| GB | 836030 A | 6/1960 |
| WO | WO-9964726 A2 | 12/1999 |

* cited by examiner

STRUCTURE AND METHOD FOR PROVIDING COMPLIANCE AND SEALING BETWEEN CERAMIC AND METALLIC STRUCTURES

CROSS-REFERENCE TO RELATED APPLICATIONS

This application claims priority to U.S. Provisional Patent Application No. 61/773,096, filed Mar. 5, 2013, the contents of which are hereby incorporated in their entirety.

GOVERNMENT RIGHTS

This invention was made with government support under N00019-04-C-0093 awarded by the United States Navy. The government has certain rights in the invention.

FIELD OF TECHNOLOGY

The disclosure relates to gas turbine engines, specifically to the use of ceramic matrix composites (CMC) therein.

BACKGROUND

Improvements in manufacturing technology and materials are the keys to increased performance and reduced costs for many articles. As an example, continuing and often interrelated improvements in processes and materials have resulted in major increases in the performance of aircraft gas turbine engines. One of the most demanding applications for materials can be found in the components used in aircraft jet engines. By operating at higher temperatures, the engine can be made more efficient in terms of lower specific fuel consumption while emitting lower emissions. Thus, improvements in the high temperature capabilities of materials designed for use in aircraft engines can result in improvements in the operational capabilities of the engine.

Non-traditional high temperature materials such as ceramic matrix composites as structural components have been employed in gas turbine engines. For several decades, composites, such as CMC, have been investigated for a wide range of applications. One aspect of the investigation has been the means by which those composite materials can be accommodated in a metallic structure, given the inherent limitations of the composite materials with regard to high local contact stresses, and the substantial difference between composite and metallic structure thermal expansion coefficients. Carried out were development, analysis, fabrication, and testing activities for a range of composite materials and applications of same, including carbon-carbon, CMC, and mixed composition ceramics and ceramic composite materials, and development and demonstration of multiple methodologies that provided compliance and sealing between the composite and metallic structures.

Such means would be in demand for the location and retention of, and sealing, advanced high temperature composite structures such as CMC. With no limitation, those means are believed to be useful in turbine blade tracks, where they provide a compliant interface between the composite structure and the metallic supporting structure and also provide locating features to maintain the position of said structure and secure sealing cooling air leakage between those components.

Some existing systems have various shortcomings, drawbacks, and disadvantages relative to certain applications. Accordingly, there remains a need in industry for the means which would allow for mitigating the high local stresses that can arise from contact between composite and metal structures. In the present novel disclosure, it is achieved via a spring arrangement resulting in load redistribution that leads to reduced local contact stresses, and by which sealing around the CMC structure to control cooling air leakage is provided.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

Ceramic matrix composites have an inherent advantage over metallic structures with respect to their ability to be operated at high temperatures, typically in excess of temperatures at which metallic structures can be operated, and to their significantly lower density when compared with high temperature metallic alloys. For that reason, replacing some metallic components in pure metallic structures with ceramic equivalents can be beneficial. On the other hand, a contact between a composite component and a metallic component of the structure can result in surface damage to both components, whether through high contact stresses and/or via wear or fretting at the interfaces between the two materials, caused by relative movement arising from large differences in thermal expansion coefficients between the two classes of materials. Presented below is the means through the use of which a compliant structure is installed to prevent or reduce local high contact stresses, provide a centering mechanism to maintain the desired position of the composite structure in the assembly, and provide for controlled leakage of cooling air around said structures.

The compliant structure comprises an interface between a turbine blade track, which is to be produced of CMC, and the metallic supporting component, with an additional component, which provides for locating the blade track axially and which also accommodates differential thermal expansion between the composite and metallic components. The compliant component is to be fabricated of a high temperature metallic alloy and to be produced in a requisite configuration using standard metal forming processes with the use of any applicable joining processes required to produce the final component.

Figure 1:
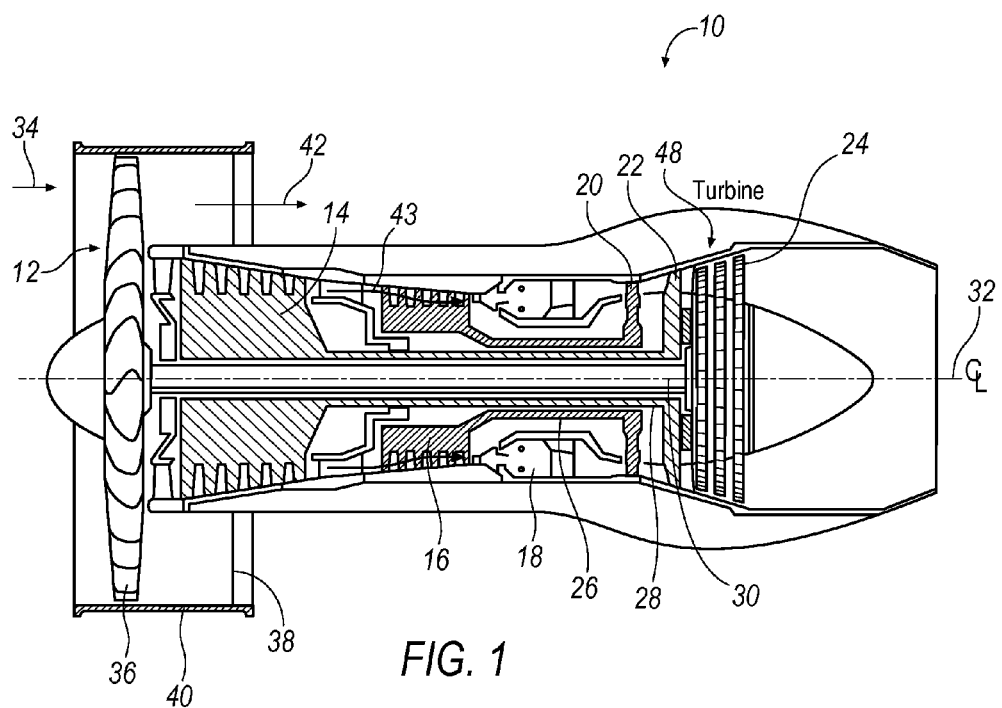
FIG. 1 depicts a schematic view of a gas turbine engine for which the present technical solution is preferably, but not exclusively, intended.

Presented in FIG. 1 is a gas turbine engine 10, which the above-mentioned compliant structure is preferably intended to be used for. However, it will be appreciated that while the exemplary embodiments are shown in the context of a gas turbine engine 10, that the novel compliant structure and its associated methodologies have applicability in other industries. Accordingly, a gas turbine engine 10 is discussed as one example of how the novel disclosure and method may be applied in an industry.

The engine 10 generally comprises a fan 12, an intermediate pressure compressor 14 and a high pressure compressor 16, a combustor 18, a high pressure turbine 20, an intermediate pressure turbine 22, and a low pressure turbine 24. The high pressure compressor 16 is connected to a first rotor shaft 26 while the intermediate pressure compressor 14 is connected to a second rotor shaft 28 and the fan 12 is connected to a third rotor shaft 30. The shafts extend axially and are parallel to a longitudinal center line axis 32. Ambient air 34 enters the fan 12 and is directed across a fan rotor 36 in an annular duct 38, which in part is circumscribed by fan case 40. The bypass airflow 42 provides engine thrust while the primary gas stream 43 is directed to the combustor 18 and the high pressure turbine 20. It is in the turbines 20, 22, and 24 of the engine 10 that the compliant component particularly comprising a novel blade track assembly 48 is located.

Figure 2:
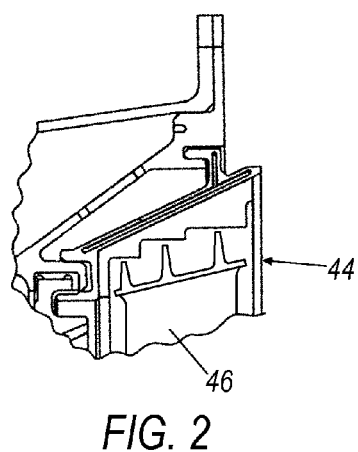
FIG. 2 shows one configuration of a blade track assembly.

Shown in FIG. 2 is an example of an enlarged sectional view of a configuration employing a metallic blade track assembly 44 over a blade 46. Positioned generally radially outward of the tips of a turbine blade 46, a blade track assembly 44 provides a sealing surface which, in conjunction with the tips of turbine blade 46 provides control (limitation) of combustion gas leakage between the blade track assembly 44 and the tips of the turbine blade 46 (where a reduction of the gap results in improved turbine performance). The replacement of the metallic blade track with the novel compliant blade track assembly 48 comprising a CMC blade track and its unique structure and method of assembly, will be further discussed in detail.

Figure 3:
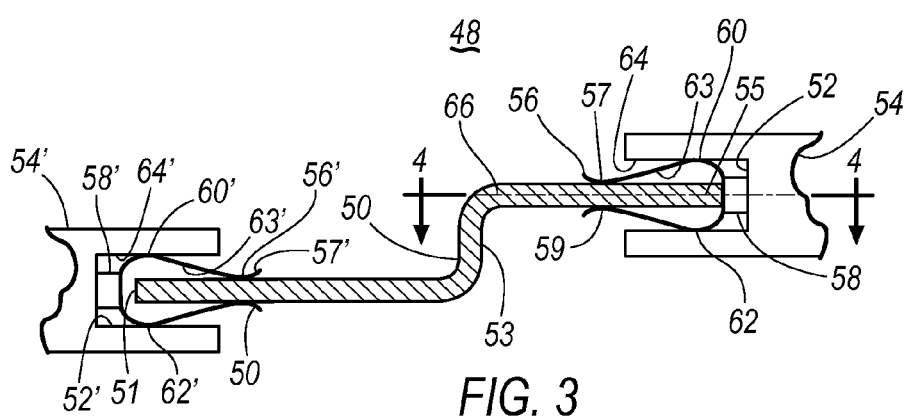
FIG. 3 shows, in circumferential view, an exemplary CMC blade track assembly to provide compliance and sealing between the CMC blade track and metallic structures.
Figure 4:
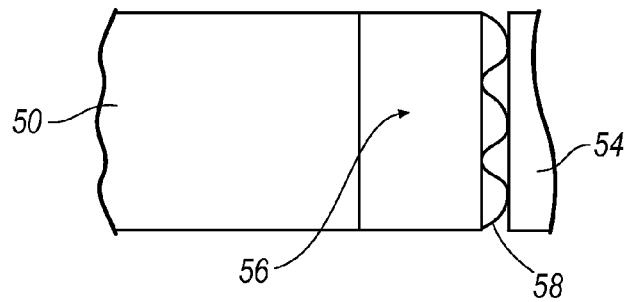
FIG. 4 shows a radial view of the FIG. 3 assembly, taken along line 4-4 in FIG. 3.

With reference to FIG. 3, the novel blade track assembly 48 is depicted as a non-rotating structure, and it may be shaped into a configuration approximating that shown in FIG. 3, when viewed in the tangential direction, and in FIG. 4, when viewed from a radial perspective. FIG. 4 is taken from the perspective of line 4-4 of FIG. 3.

The compliant component blade track assembly 48 comprises a CMC component such as a blade track 50 that is fixed within a u-shaped pocket 52 of a metallic hanger 54 by means of a clip 56 and a wavy washer (such as a marcelled, serpentine-shaped spring) 58. Free ends 57, 59 of the clip 56 are preferably made curved to ease the installation of the CMC blade track 50 into the clip 56. The CMC blade track 50 is segmented circumferentially to accommodate the differential thermal expansion characteristics between CMCs and metallic component, such as the hanger 54 with the pocket 52. The wave washer 58 secures axial orientation of the track and is bonded to the clip 56 via brazing or other applicable joining method to produce an integral structure within the metallic hanger 54. The c-shaped spring clip 56 secures radial compliance of the blade track 50 within the metallic hanger 54. Providing sealing via contacts 60, 62 at both top and bottom surfaces as shown, the clip 56 will ensure controlled leakage of cooling air required to ensure that acceptable temperatures are maintained for the metallic structures. The angled surfaces of the clip 56 will provide a compliant structure between the composite blade track 50 and the pocket 52, into which the track-clip-washer assembly is installed. The compliance is realized by virtue of the angled surface 63 being in contact, at 60 and 62, with the inside walls 64 of the locating pocket 52, thereby preventing direct contact between the blade track structure 50 and the inner u-shaped geometry of the pocket 52 of the hanger 54.

The metallic blade track assembly 44 in a gas turbine 10 can be replaced by the novel blade track assembly 48. The metallic hanger 54 is a part of the engine turbine section and expands or contracts radially and axially as a function of the metallic structure local temperatures. The novel blade track 50 has a forward end 51, a stepped portion 53, and a rearward end 55. The rearward end 55 is substantially parallel to a center line 66 and the forward end 51 is co-aligned with the centerline 66. The u-shaped pocket 52 has sufficient depth to accommodate a portion of the rearward end 55, the clip 56 and the washer 58. In positioning the ends 55-55' of the CMC component, the latter is forced into the clips 56-56' engaging the washers 58-58' sufficiently enough to cause the washers to impinge upon the pockets 52-52' of the hangers 54-54'.

The CMC blade track 50 is carried radially by the metallic hanger 54 and is centered within the metallic hanger 54 via wave washers 58 that may be positioned on either end, forward or rearward, of the CMC blade track 50. Thus, the blade track 50 has a self-centering feature by virtue of the biasing forces that are generated by the wave washers 58 and the spring clip 56. The same configuration is applicable to the forward end 51 of the CMC blade track 50. The blade track 50 is therefore centered between the two locating pockets, i.e., the forward pocket 52' and a rearward pocket 52 by virtue of the spring clips 56-56' and wave washers 58-58' that are located in each pocket 52-52', respectively. Deflection of the wavy spring 58 will also accommodate the differential thermal expansion between the CMC blade track 50 and the metallic hanger 54. The clips 56-56' provide an air or fluid seal at the contacts 60-60' and 62-62' to minimize leakage of cooling air across the assembly 48. It will be appreciated that an exemplary blade 50 is shown in FIG. 3. Other blades having conical or cylindrical blade tips can alternatively be used with the CMC blade track assembly 48.

The compliant structure 48 disclosed herein provides radial and axial location of the CMC blade track 50, both locating the track radially and axially by centering same between the internal walls of the metallic hanger 54. The local contact loads/stresses in the CMC structure are reduced to an acceptable level via the compliant nature of the clip in both the radial and axial directions. The clip structure extending circumferentially around the assembly also provides sealing of the blade track to the metallic support structure in both the outward and inward radial directions and in the axial direction to minimize leakage of cooling air and to thus provide improved efficiency of the turbine.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as illustrative instead of merely restrictive.

What is claimed is:

1. A gas turbine engine structure comprising:
a ceramic matrix composite (CMC) component;

a metallic supporting component; and
an interface component provided between the CMC component and the metallic supporting component, the interface component comprising a clip, the clip of the interface component having opposing angled surfaces receiving the CMC component therebetween and positioning the CMC component in a radial direction relative to the metallic supporting component, the clip being positioned relative to the metallic supporting component with a washer in a pocket of the metallic supporting component while curved ends of the clip extend from the metallic supporting component for receiving the CMC component into the clip, and the curved ends of the clip contact the CMC component external to the metallic supporting component.

2. The gas turbine engine structure as claimed in claim 1, wherein the CMC component includes a blade track, and
wherein the CMC component is segmented circumferentially to accommodate the differential thermal expansion characteristics between CMC component and metallic component.

3. The gas turbine engine structure as claimed in claim 1, wherein the clip extends circumferentially around the CMC component and the opposing angled surfaces of the clip create a seal between the CMC component and the inner surfaces of the metallic supporting component.

4. The gas turbine engine structure as claimed in claim 1, wherein the clip member minimizes local contact stresses between the CMC component and the metallic supporting component.

5. The gas turbine engine structure as claimed in claim 1, wherein the metallic supporting component includes a hanger.

6. The gas turbine engine structure as claimed in claim 1, the clip member being positioned within the pocket of the metallic support component, thereby enclosing the washer by the metallic supporting component and the clip member.

7. The gas turbine engine structure as claimed in claim 1, wherein the washer is positioned adjacent the clip, the washer aiding in axially orientating the CMC component.

8. The gas turbine engine structure as claimed in claim 1, wherein the washer comprises a serpentine-shaped spring between the CMC component and the metallic supporting component.

9. The gas turbine engine structure as claimed in claim 1, wherein the CMC component includes:
a first end substantially aligned with a centerline of the engine structure,
a stepped portion angled relative to the first end, and
a second end angled relative to the stepped portion and substantially parallel with the centerline.

10. A compliant structure for a machine comprising:
a ceramic matrix composite (CMC) component;
a metallic supporting component; and
an interface component provided between the (CMC) component and the metallic supporting component,
wherein the interface component comprises a clip member with opposing angled surfaces receiving the CMC component therebetween and centering the CMC component relative to the metallic supporting component, the clip member being operable to reduce stress of the CMC component, and the clip member being positioned relative to the metallic supporting component with a washer in a pocket of the metallic supporting component while curved ends of the clip member extend from the metallic supporting component for receiving the CMC component into the clip member, and
wherein the CMC component includes a first end substantially aligned with a centerline of the engine structure, a stepped portion angled relative to the first end, and a second end angled relative to the stepped portion and substantially parallel with the centerline.

11. The compliant structure as claimed in claim 10, wherein the CMC component is a blade track.

12. The compliant structure as claimed in claim 10, wherein the metallic supporting component includes a u-shaped hanger that receives a portion of the CMC component.

13. The compliant structure as claimed in claim 12, wherein the washer is located adjacent an end of the CMC component, the clip member and the washer being operable to maintain the CMC component offset from the metallic supporting component.

14. The compliant structure as claimed in claim 10, wherein the washer comprises a marcelled spring, between the CMC component and the metallic supporting component, that provides axial orientation of the CMC component.

15. The compliant structure as claimed in claim 10, wherein the clip member extends around the CMC component, the clip creates a seal between the CMC component and the metallic supporting component.

16. A method of positioning a ceramic matrix composite (CMC) component relative to a metallic component, the method comprising:
providing the CMC component;
providing the metallic supporting component;
providing an interface component with opposing angled surfaces for a compliant accommodation of the CMC component relative to the metallic support component;
attaching the interface component to the metallic supporting component, the interface component being positioned relative to the metallic supporting component with a washer in a pocket of the metallic supporting component while curved ends of the interface component extend from the metallic supporting component for receiving the CMC component into the interface component, and the curved ends of the interface component contact the CMC component external to the metallic supporting component; and
inserting the CMC component into the opposing angled surfaces of the interface component.

17. The method as claimed in claim 16, wherein attaching the interface component comprises inserting the washer into the pocket of the metallic supporting component.

18. The method as claimed in claim 16, wherein the interface component includes a clip, and attaching the interface component comprises inserting the clip into the pocket of the metallic supporting component.

19. The method as claimed in claim 16, wherein inserting the CMC component into the opposing angled surfaces of the interface component comprises creating a seal between the CMC component and the inner surfaces of the metallic supporting component.

20. The method as claimed in claim 16, wherein the interface component includes a clip, and inserting the CMC component into the interface component includes forcing the CMC component into the clip having the opposing angled surfaces, the clip engaging the washer sufficiently to cause the washer to impinge upon the pocket of the metallic supporting component.

* * * * *